Sept. 15, 1931.  S. K. TOWSON  1,823,516
INDUSTRIAL TRUCK
Filed Feb. 6, 1930  3 Sheets-Sheet 2
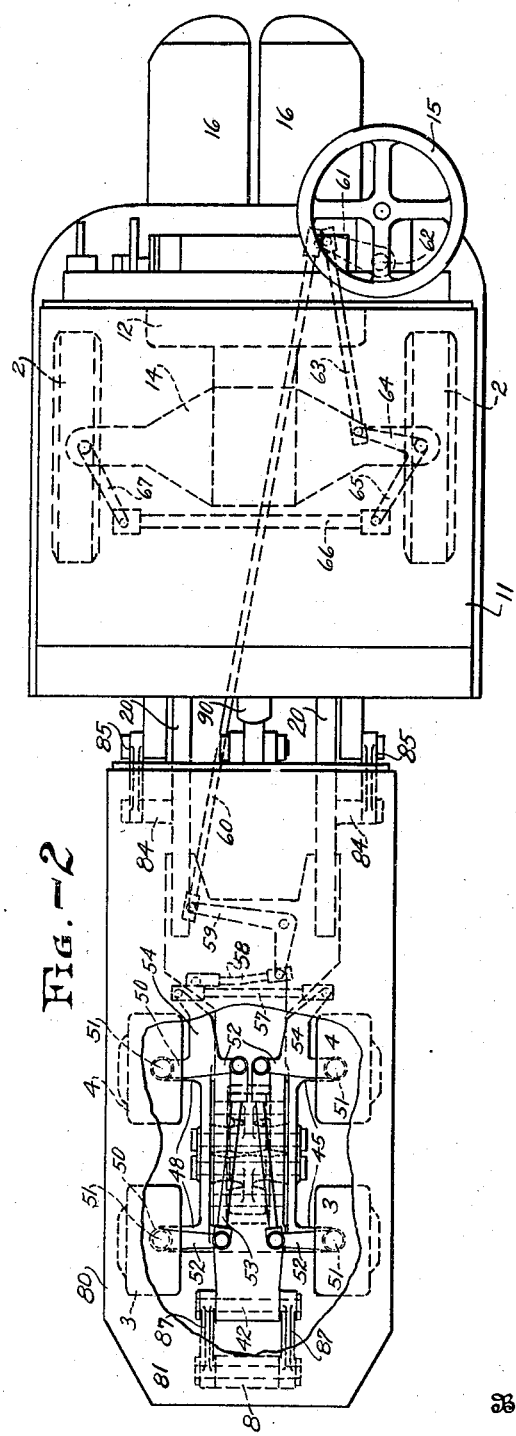
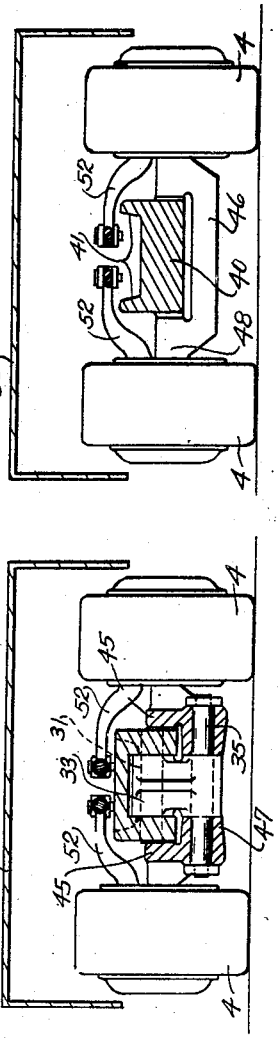
Inventor
Sheldon K. Towson
By Bates, Golrick & Teare
Attorney

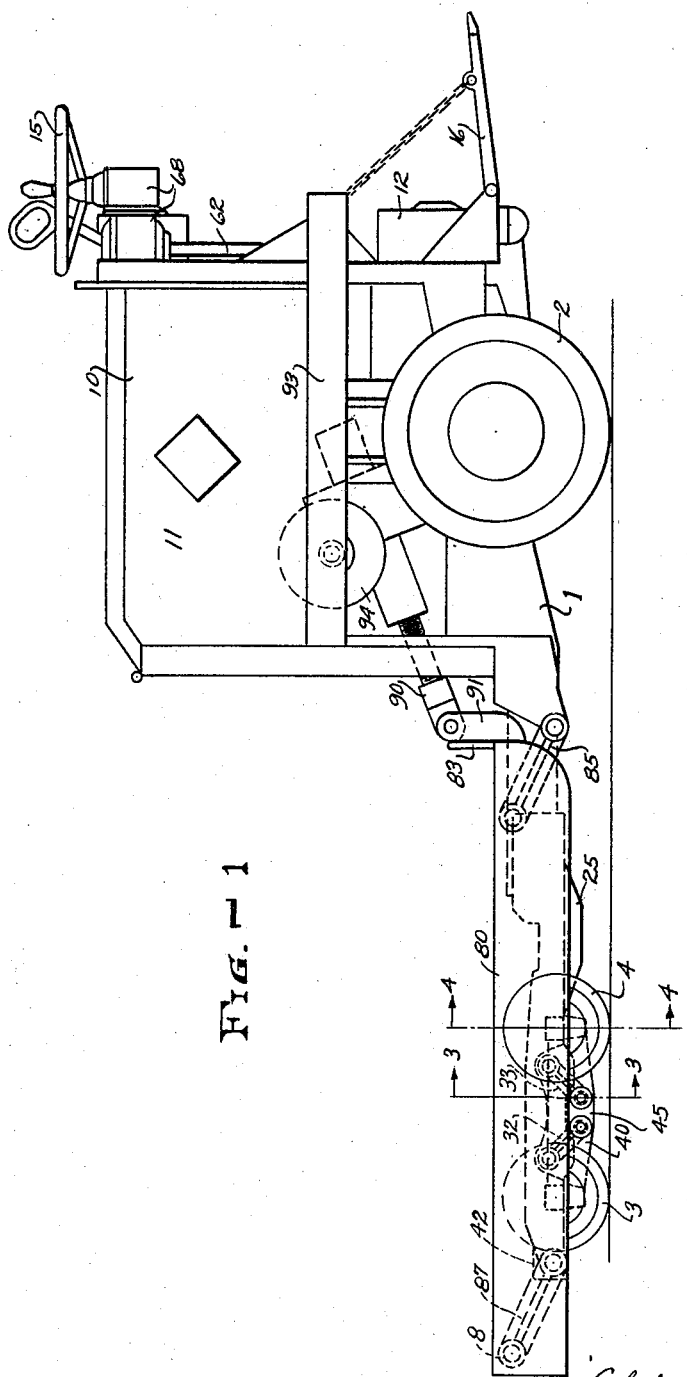

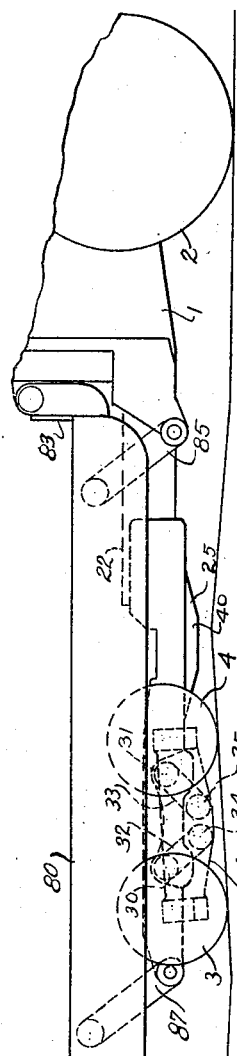
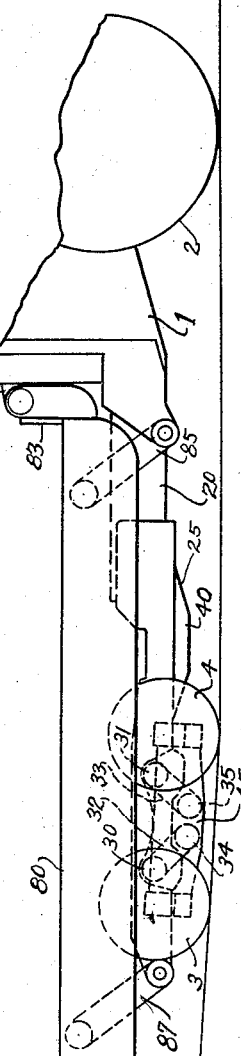
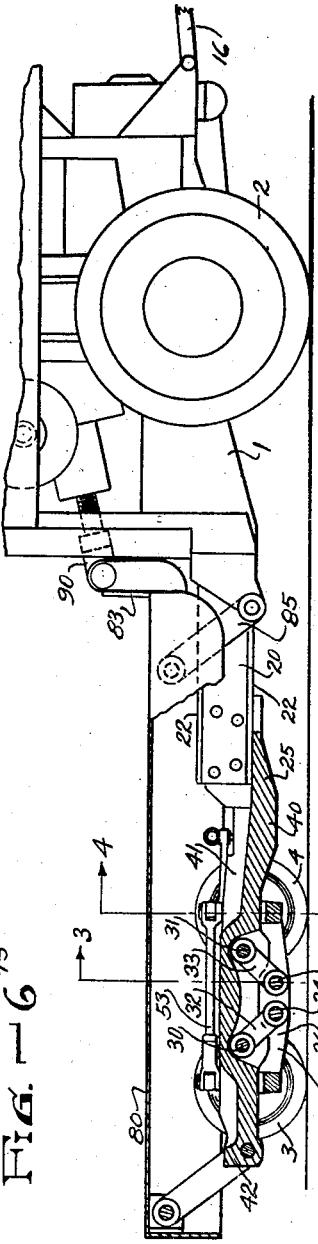

Patented Sept. 15, 1931

1,823,516

UNITED STATES PATENT OFFICE

SHELDON K. TOWSON, OF CLEVELAND HEIGHTS, OHIO, ASSIGNOR TO ELWELL-PARKER ELECTRIC COMPANY, OF CLEVELAND, OHIO, A CORPORATION OF OHIO

INDUSTRIAL TRUCK

Application filed February 6, 1930. Serial No. 426,414.

This invention relates to improvements in load transporting mechanisms and the illustrated embodiment thereof is shown as being particularly adapted for use in industrial trucks of the platform type, which are used for handling loads of material in and about factory buildings.

Industrial trucks of such type have been in use for some time, and, generally consist of a lifting platform and a driving unit. The driving unit has generally been supported by a pair of comparatively large wheels mounted beneath the unit, while the lifting platform has been supported by a pair of relatively small load supporting wheels disposed beneath, and supporting substantially the entire weight of a load on the platform.

Recent changes in manufacturing methods have required the use of trucks capable of carrying heavier loads than heretofore. This necessitates better traction arrangement and support for the platform. The obvious way of accomplishing this would be to provide better wheel tread members. However, notwithstanding extensive research, all of the difficulties have not as yet been solved in this matter. Recent developments in such industrial trucks have necessitated the provision of a plurality of pairs of relatively small load supporting wheels disposed beneath the lifting platform.

It is highly desirable that the wheels beneath the load supporting device, such as a platform adapted to raise a load from a position close to the ground, be of a small diameter so as to permit the platform, when the latter is in its lowered position, to be inserted beneath a loaded skid platform having a minimum ground clearance.

It is also essential that the wheels be dirigible to facilitate the turning of the truck about a small radius such as is required in the ordinary industrial plant where the column centers and machine equipment compels comparatively sharp corners to be turned by the industrial truck. Because of the fact that all the wheels must be dirigible, it follows that they cannot be of an excessive width. Hence, it is desirable to keep them as narrow as possible, thereby making the line contact of the floor surface short and preventing excessive strains on the structure due to the local skidding of the wheels when the truck is being turned and also preventing excessive wear on the tires.

It is also found that because the truck is to be utilized for comparatively heavy loads, that the load-bearing wheels must contact with the floor ground surface at all times to evenly distribute the load between the wheels. The floor or ground condition prevalent in most industrial plants is very unsatisfactory, in that it is usually uneven and comprises many small slopes, for example, when changing from one floor to another, or, when entering or leaving a freight elevator, or, when loading cars or the like, it therefore follows that the load bearing must not only be dirigible but that a provision must be made whereby the load will be distributed to all of the load carrying wheels substantially all of the time.

It is also necessary, in such truck, to minimize the height of the small load carrying wheels and the sub-frame mounting therefor, while still maintaining adequate strength in the mounting for supporting the load. The wheel mounting and chassis extension must also be made in such a manner as to provide for adequate clearance of the steering linkage mechanism at all times and under all conditions. The steering mechanism must be compact and must be installed in such a manner as to permit free rocking movement of the wheels on the wheel mounting without interfering with the steering operation of the truck.

The general object of this invention, therefore, is to provide an industrial truck capable of handling loads of varying weight and wherein the various structural and operating difficulties, as heretofore mentioned, are overcome.

Another object of the invention is to provide an industrial truck adapted for lifting a load from a position comparatively close to the ground and transporting the load over uneven surfaces without causing any excessive twisting strains to be set up in the truck chassis, and without undue wear upon the wheel treads.

Another object of the invention is to provide an industrial truck, having a plurality of pairs of load bearing wheels, spaced to lie beneath the load bearing platform and provide a mounting for such wheels wherein the overall height of the truck will be low enough to permit a load to be picked up from a position comparatively close to the ground.

A more specific object of the invention is to provide an industrial truck frame extension having a plurality of dirigible load carrying wheels and a mounting for the wheels wherein there may be unusual supporting strength combined with great operating flexibility and minimum height. And, moreover, a truck which will readily transport comparatively heavy loads and so arranged as to pick the loads up from an extremely low level.

A further object is to provide a mounting for a plurality of pairs of wheels, which may be so connected to the chassis as to permit great operating flexibility and at the same time present great strength to all operating stresses.

Another object is to provide an under-carriage construction which may be pivotally mounted to a low slung portion of the chassis, wherein there may be flexibility between the chassis and the sub-frame or wheel mounting and wherein the strength of the frame members and wheel mounting is accomplished in a minimum height.

Further objects and features of the invention will become apparent from the following description relating to the accompanying drawings and the essential novel characteristics are summarized in the claims.

In the drawings, Fig. 1 is a side elevation of an industrial truck embodying my invention; Fig. 2 is a plan view of the truck whereein a portion of the elevated platform is broken away to show more clearly the mounting and the chassis construction; Fig. 3 is a transverse vertical section as indicated by the lines 3—3 in Figs. 1 and 7; Fig. 4 is a transverse horizontal section indicated by the lines 4—4 on Figs. 1 and 7; Figs. 5 and 6 are partial side elevations illustrating different operating capabilities of the mechanism constructed according to my invention; Fig. 7 is a side elevation, partially broken away, of the chassis and sub-frame or wheel mounting.

Referring again to the drawings, wherein a preferred embodiment of a truck designed for carrying comparatively heavy loads, is illustrated, there is a main chassis or frame 1, having mounted thereon, at its forward end, a pair of driving wheels 2, and adjacent its rear, two pairs of relatively small load carrying wheels 3 and 4. All of the wheels in the embodiment illustrated, are dirigibly arranged, so as to turn about individual vertical axes, such an arrangement permitting the truck to be turned about a small turning radius.

Standing upwardly from the forward end of the truck is a frame structure, generally indicated at 10 which consists of a support for a suitable battery or other power supplying mechanism and certain operation controls. In the embodiment illustrated a housing 11 is mounted on the frame structure 10 and is adapted to encase a battery. Beneath the housing is a motor 12. Suitable driving connections, reduction gearing, differential mechanism, etc., generally indicated at 14, connect the motor to the driving wheels 2. The various operator's controls, including the steering wheel 15 and pivoted platform members 16, extending forwardly from the truck, and which may also comprise part of the control, are mounted at the extreme forward end of the frame structure 10.

Rigid with the frame, and extending rearwardly therefrom, are a pair of sill members 20, which, as shown, comprise channel shaped sections having comparatively deep webbed portions having inwardly extending horizontally flanges 22. The portion of the chassis which supports the platform or load lifting mechanism comprises, in the embodiment shown in the drawings, a comparatively heavy centrally disposed frame extension member, enlarged horizontally at the end adjacent the frame sills 20. The chassis frame extension member is made with a minimum depth which is consistent with rigidity and strength and its rear portion or that farthest away from the sills is made comparatively narrow in order that the dirigible wheels may lie comparatively close to the center of the truck and not extend beyond the platform edges. This extension member is preferably formed as a casting and is generally indicated at 25. Toward the rear of the frame extension are mounted a pair of transverse rock shafts 30 and 31. Pivotally mounted on these rock shafts are suitable links 32 and 33. The other end of the links 32 and 33 are pivotally mounted on rock shafts 34 and 35, which are secured to a wheel mounting or sub-frame member 36, on which are mounted the wheels 3 and 4.

The preferred construction of the chassis extension comprises a comparatively rigid and substantially horizontal web portion 40 which has substantially vertical side flanges 41. The forward portions of the flanges and web embrace the sills 20 of the truck frame and form a rigid connection therewith. Near the extreme rear portion of the casting, the web is suitably braced by a boss 42 to provide a support for a platform to be later described. It will be noted that, through the greater portion of its length, the side flanges of the frame extension extend upwardly from the web, whereby clearance for the steering knuckles may be had between the chassis and a suitable platform. However, in that portion of the chassis extension which embraces the rock shafts 31 and 32, the web rises slightly and the flanges extend downwardly to support the rock shafts, thereby giving great rigidity and strength to the side frame.

The preferred construction of the wheel mounting or sub-frame 36 is best shown in Figs. 1, 2, 3 and 7. Here it will be noted that the sub-frame comprises a pair of side members 45 adapted to lie immediately outside and adjacent the downwardly extending flanges 41 of the chassis. The members 40 are joined at their ends with suitable cross members 46 which underlie the chassis. The sub-frame 36 is provided with bosses 47 which underlie the flanges of the chassis and provide strength to support the rock shafts 34 and 36. Clearance is provided between the cross members 46 and the bosses 47 of the wheel mounting and the chassis to permit movement of the wheel mountings independent of and with relation to the chassis. The side members 45 of the sub-frame are provided with outwardly extending portions 48, which are adapted to carry the wheel pivots. The construction of the sub-frame is, in general, U-shaped, and is adapted to embrace the sides of and extend beneath the chassis frame. The sub-frame is also capable of longitudinal floating movement relative to the chassis frame.

Each of the wheels 3 and 4 are provided with the usual steering knuckle members 50, which are bifurcated in the usual manner to embrace the extending portions 48 of the sub-frame and are secured thereto by suitable vertical pins indicated at 51. Each steering knuckle is provided with an inwardly extending arm 52, which passes over the top of the chassis extension, with adequate clearance to allow the arms, and suitable tie bars therefor, to move up and down with the rocking wheel mounting or sub-frame, but free from the chassis extension and platform at all times. In the embodiment illustrated, the arm 52 of each load bearing wheel 3 is joined by a tie bar 53 having suitable ball and socket connections to the arm 52 of the load bearing wheel 4 lying on the corresponding side of the chassis.

The steering connection comprises in addition to the arms 52 and tie rods 53, arms 54, which are rigid with the arms 52 of the wheels 4, and which are connected together by a tie rod 57 having suitable ball and socket connections and which lies above the chassis. The rod 57 is connected by means of a ball joint to a link 58, which in turn is connected by a ball joint to one arm of a ball crank 59, pivotally mounted on the chassis 30, the other arm of which is connected by means of a ball joint to one end of a rod 60, which reaches forwardly and at its far end is connected by means of a ball joint to a lever 61 mounted on the steering column 62. The movement of the arm 62 also operates through the link 63 to move a steering knuckle 64 of one of the forward or driving wheels 2, and through the medium of an arm 65, rigid with the steering knuckle, and a tie rod 66, operates the steering knuckle 67 of the other wheel 2. The steering column 62 is connected by suitable gearing housed in a casing 68 to the steering wheel 15. The rotation of the wheel 15 by the operator, operates through the linkage described, to turn the wheels 2, 3 and 4 about their respective vertical axes and simultaneously steer the truck.

It will be noted that the arrangement is so designed that the wheels may swing an adequate amount for turning a short corner notwithstanding the fact that the wheels are in the same plane as the hub formations on the sub-frame and the chassis extension member 25. The arrangement of the arms and links throughout the entire steering mechanism is such that the axis of each wheel intersects the axis of all of the other wheels at a common turning locus, which, depending on the length of the turning radius, moves along a turning loci extending transversely of the truck at a point intermediate its ends.

The platform indicated at 80 may be of any suitable construction. As shown, it comprises a substantially rectangular member, flanged downwardly at all of its edges for strength and having a plane simple supporting surface 81 entirely overlying the whole under-carriage structure. The platform has, at its forward edge, an upwardly extending stiffening member 83, which may readily be an angle section. On its underside and near its ends, the platform has downwardly extending brackets 84 near its forward end. The brackets 84 are connected by a pair of spaced links 85, each of which is pivoted at one end to the brackets 84 and at the other end to the rear end of the frame 30. At the rear of the platform are downwardly extending bracket members 88 to which are pivoted spaced links 87 having suitable pivoted connections to the boss portion 42 of the sub-frame.

A suitable power mechanism for swinging the platform, to raise and lower the same with the load thereon, may comprise a power device including a main ram bar 90, pivoted to suitable ears on the stiffening member 93 of the platform. A motor 94 and suitable gearing are arranged to move the ram bar inwardly toward the housing to raise the platform and outwardly toward the rear of the truck to lower the platform. The mechanism shown for raising and lowering the platform is, to a large extent exemplary, in that it is understood that the platform may be of the tier lift type, arranged to lie closely adjacent the sub-frame and frame extension at its lower position, so as to pick up a load from a comparatively low level, but which, by reason of suitable elevator mechanism, may raise the load to a considerably higher elevation than may be done by means of the lower platform or load raising support, such as is illustrated. The clearance between the sub-frame 36 and the chassis extension 25 is of such a distance as to allow only a limited movement between the sub-frame and the chassis, this distance is sufficient, however, to provide for the discrepancies in floor surface of industrial plants.

Figs. 5, 6 and 7 illustrate the rocking of the wheel mounting or sub-frame which supports the two pairs of wheels 3 and 4. This permits the wheels to remain on the supporting surface, under ordinary conditions found in industrial plants. It will be noted that the transverse rock shafts 30 and 31, which are mounted in the sub-frame member 25, are spaced a comparatively long distance apart with relation to the rock shafts 34 and 35, which are mounted in the sub-frame 36 and are spaced relatively close together. Hence, while the front wheel of the truck passes over a grade and the rear wheels are on the grade the links 32 and 33 will assume slightly different angular positions while maintaining both pairs of wheels 3 and 4 in contact with the supporting surface. It will be noticed that the wheel mounting member in this case wings slightly about a plurality of transversely extending axes, and as the wheels pass to the down grade, the links swing in the opposite direction, thereby permitting the wheels to follow the downward grade and retaining the load evenly distributed on the wheels 3 and 4.

From the above description it will be seen that I have provided an industrial truck having a sub-frame support for a relatively low lift platform, wherein there is a multiple arrangement of small load supporting wheels and which truck will adequately support and carry comparatively heavy loads.

It will also be seen that I have provided an industrial truck having a platform disposed over a low swung portion of the frame, whereby the platform may be lowered to receive a load and whereby there is a double pivotal connection between the chassis and the sub-frame, which permits the sub-frame to float longitudinally relative to the chassis.

It will be understood that each portion of the arrangement shown and described may be modified with reference to the remaining portion without departing from the scope of the invention.

It will also be apparent to those skilled in the art that my invention is adaptable to a variety of forms and not necessarily confined to the industrial truck art.

I claim:

1. In an industrial truck of the character described, the combination of a chassis frame structure having large dirigible driving wheels, there being two pairs of relatively small wheels attached to the truck frame at the opposite end thereof, said last named wheels being mounted upon a sub-frame and the sub-frame and the main frame being connected by a double pivotal connecting means, whereby the wheels and sub-frame may float about transversely extending pivotal axes relative to the main frame when the truck is passing over uneven surfaces, said connecting means including spaced links, one end of each link being pivoted directly to the chassis and the other end being pivoted directly to the sub-frame and adapted to transmit the entire load from the chassis to the sub-frame.

2. In an industrial truck of the character described, the combination of a chassis frame structure having large dirigible driving wheels, there being a plurality of relatively small wheels attached to the truck frame at the opposite ends thereof, said wheels being mounted upon a sub-frame and the sub-frame and the main frame being connected by a double pivotal connecting means, whereby the wheels and sub-frame may float about transversely extending axes, within a limited range, relative to the main frame when the truck is passing over uneven surfaces, said connecting means including a pair of longitudinally spaced links, one end of each link being pivoted to the sub-frame adjacent its longitudinal center and the other end of each link being pivoted to the chassis.

3. In an industrial truck the combination of a frame structure, a low slung chassis portion extending rearwardly from the frame structure, a plurality of spaced transversely extending shafts mounted on the low slung chassis portion, a sub-frame unit including a plurality of pairs of load supporting wheels, a plurality of transversely extending shafts mounted on the sub-frame and means connecting the shafts in the chassis with the shafts in the sub-frame for permitting the sub-frame to rock longitudinally relative to the chassis frame.

4. In an industrial truck the combination of a frame structure, a low slung chassis portion extending rearwardly from the frame structure, a pair of spaced transversely extending pivot members mounted on the low slung chassis portion, a sub-frame unit including two pairs of load supporting wheels, a pair of transversely extending spaced pivot members mounted on the sub-frame and links connecting the shafts in the chassis with the shafts in the sub-frame for permitting the sub-frame to float longitudinally relative to the chassis frame about a plurality of transversely extending axes, means to limit such movement, and wherein said links are adapted to transmit the load from the chassis to the sub-frame.

5. A wheel mounting for a plurality of pairs of wheels, comprising a sub-frame having a plurality of pairs of wheels, a plurality of spaced transverse pivot members carried by said sub-frame, a chassis to be supported by said wheels, said chassis including a plurality of transverse pivot members spaced apart a distance differing from the spacing of the pivot members in the sub-frame and connecting members connecting each pivot of the sub-frame with a pivot of the chassis and adapted to transmit the load from the chassis to the sub-frame, whereby the sub-frame may float longitudinally relative to the chassis.

6. A wheel mounting for a plurality of pairs of wheels, comprising a sub-frame having two pairs of wheels, a pair of spaced pivot members carried by said sub-frame, a main chassis to be supported by said wheels, said chassis including a pair of pivot members spaced apart a distance differing from the spacing of the pivot members in the sub-frame and connecting members connecting each pivot of the sub-frame with a pivot of the chassis whereby the sub-frame may float longitudinally relative to the chassis, and means to limit the floating movement and wherein said connecting members are adapted to transmit the entire load from the chassis to the sub-frame.

7. A wheel mounting for a plurality of pairs of wheels, comprising a sub-frame having axes for the wheels, a plurality of spaced transverse pivot portions carried by said sub-frame, a chassis to be supported by said wheels, said chassis including a plurality of spaced transverse pivot portions, and non-parallel connecting members connecting each pivot of the sub-frame with a pivot of the chassis and adapted to transmit the load from the chassis to the sub-frame, whereby the sub-frame may float longitudinally relative to the chassis on a plurality of transverse axes.

8. A wheel mounting for a plurality of pairs of wheels, comprising a sub-frame having axle extensions for said wheels, a pair of transversely extending spaced pivots carried by the sub-frame, a load carrying chassis having transversely extending spaced pivots, link members connecting the sub-frame pivots with the chassis pivots, whereby relative movement between the sub-frame and the chassis will rock the links in opposite directions, and wherein the load is transmitted directly from the chassis to the sub-frame through the medium of said links.

9. A wheel mounting for two pairs of wheels, comprising a sub-frame having axle extensions for said wheels, a pair of transversely extending spaced pivots carried by the sub-frame below the plane of said axles, a load carrying chassis above said sub-frame and having transversely extending spaced pivots, rigid link members adapted to transmit the load and connect the sub-frame pivots with the chassis pivots whereby relative movement between the sub-frame and the chassis will cause one pair of wheels to move downwardly and the other pair to move upwardly.

10. A wheel mounting for a plurality of pairs of wheels, comprising a sub-frame having axle extensions for said wheels, a pair of transversely extending spaced pivots carried by the sub-frame, a load carrying chassis having transversely extending spaced pivots, link members connecting the sub-frame pivots with the chassis pivots and adapted to transmit the load directly from the chassis to the sub-frame, whereby the sub-frame will float longitudinally relative to the chassis and said link members adapted to prevent relative transverse movement between the chassis and the sub-frame.

11. A wheel mounting for two pairs of wheels, comprising a sub-frame having axles for said wheels, a pair of pivots carried by the sub-frame, a load carrying chassis above said sub-frame and having spaced pivots thereon, non-parallel link members adapted to transmit the load from the chassis to the sub-frame, the opposite ends of each link being pivoted to the chassis and sub-frame respectively.

In testimony whereof, I hereunto affix my signature.

SHELDON K. TOWSON.